Dec. 31, 1963
C. R. HULST
3,115,663
ROLLER-TYPE FLOOR WAXER
Filed Oct. 26, 1961
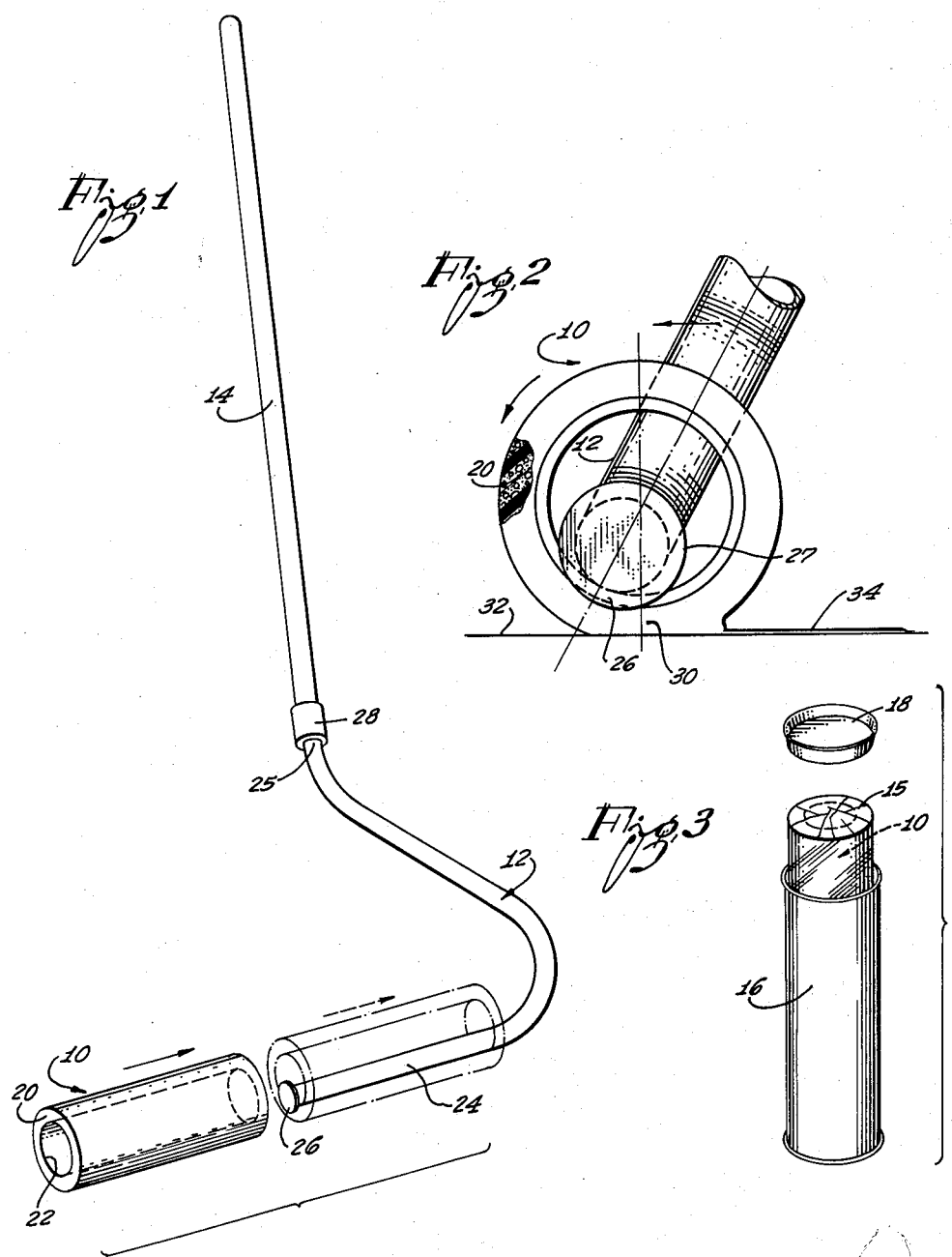
INVENTOR:
C. Reynolds Hulst
Attorneys ROLLER-TYPE FLOOR WAXER
Cornelius Reynolds Hulst, Laguna Beach, Calif., assignor to Merry Maid Co., Inc., Newport Beach, Calif., a corporation of California
Filed Oct. 26, 1961, Ser. No. 147,940
7 Claims. (Cl. 15—506)

This invention relates to a device for waxing floors and, more particularly, relates to such a device having a disposable wax-impregnated foamed plastic roller for application to the floor.

One object of the invention is to construct such a device for highly efficient wax application and a second equally important object is to package such a device in dismantled state for assembly by the purchaser. An additional object is to provide such a device that is of relatively simple and inexpensive construction.

Certain problems arise in the attainment of these objects because the device is purchased and assembled by housewives and therefore should be designed for an exceedingly simple assembly procedure that is obvious to the purchaser without the need of detailed printed directions. The assembly procedure should not require special skill nor the use of tools. Unfortunately, designing a roller device for high efficiency is only too likely to produce a device that is difficult to assemble and taking a further step to simplify the assembly procedure may result in undue increase in cost.

The present invention finds the solution to these problems in the fact that a foamed plastic roller having a relatively large axial bore may be driven in an advantageous manner by an axle member that is substantially smaller in diameter than the bore. In the preferred practice of the invention the diameter of the axle member is on the order of one-half the diameter of the roller bore and the radial dimension of the foamed plastic is relatively thin, being of the order of two-thirds of the diameter of the axle member.

Since the axle member is substantially smaller in diameter than the inside diameter of the roller bore, the axle member may be positioned in the lower half of the bore in tangential contact with the inner circumferential surface of the bore, there being ample room for the axle member to shift forward from a central position relative to the bore. With the axle member manually urged downward and forward it propels the roller forward and at the same time squeezes an adjacent continuously changing radial portion of the foamed plastic cylinder against the floor for progressive release of the wax from the roller. The axle member tends to climb the forwardly sloping inner circumferential surface of the roller with the consequent application of a forwardly downwardly squeezing force that is conducive to both release and spreading of the wax.

The use of an axle member of relatively small diameter is of further advantage because the axle member makes only line contact with the inner surface of the bore. Even when the axle member becomes greatly worn, the zone of mutual contact is narrow by virtue of the small diameter of the axle member. Consequently, frictional resistance is reduced to the minimum and no lubricant is required.

A further and important advantage of using an axle member of relatively small diameter is that it both solves the problem of simplifying the assembly procedure and solves the problem of making the construction extremely economical. The knocked-down unit comprises simply a disposable cylinder of wax-impregnated foamed plastic having a plastic cylindrical liner, a separate axle member with a radial flange on one end, and a separate handle that is rigidly attachable to the axle member.

In the initial embodiment of the invention, the inside diameter of the plastic liner is approximately one and one-half inch, the diameter of the axle member is approximately three-fourths inch, and the diameter of the end flange of the axle member is approximately one inch. To a housewife it is obvious at a glance that the flanged end of the axle member is to be inserted through the axial bore formed by the plastic liner and, with the liberal clearance of one-quarter inch, the insertion is no problem.

The preferred embodiment of the invention consists of only the three separate parts mentioned above. The first part, the wax-impregnated foamed plastic cylinder with its plastic liner, is packaged in a suitable cylindrical container. The second part, the axle member, is a piece of bent thin-walled tubing having a straight portion at one end to serve as a handle and having a nylon insert at this one end to form the radial flange. The piece of tubing is curved with its second end perpendicular to its first end. The third part is simply a wooden rod that may be inserted in the second end of the tubing to serve as a handle.

A feature of the invention is that the wood handle is not indispensable because the second end of the tubing has a plastic sleeve that is dimensioned to receive the metal tube of a conventional vacuum sweeper. In the event that the wooden handle is broken or misplaced, the metal tube of a vacuum cleaner may be readily substituted.

The features and advantages of the invention may be understood from the following detailed description and the accompanying drawing.

In the drawing, which is to be regarded as merely illustrative:

FIG. 1 is a perspective view showing the handle assembled to the axle member with the axle member poised for insertion into the wax-impregnated foamed plastic cylinder;

FIG. 2 is an end elevation of the assembled device in operation showing how the foamed plastic cylinder is squeezed against the floor by the relatively small axle member; and FIG. 3 is a perspective view showing how the wax-impregnated foamed plastic roller is packaged in a cylindrical container that may be used to store the roller when the device is not in use.

In FIG. 1 which illustrates the preferred and initial embodiment of the invention, the three separate parts are a wax-impregnated roller, generally designated by numeral 10, an axle member, generally designated by numeral 12, and a wooden rod 14 which is rigidly attachable to the axle member to serve as a handle. When the device is sold to a purchaser the handle 14 is separate from the axle member 12 and the axle member is separate from the roller, the roller being packaged in the manner shown in FIG. 3. In FIG. 3 the wax-impregnated roller 10 is wrapped in a plastic sheet 15 and is housed in a cylindrical container 16 having a removable cover 18.

The roller 10 comprises a cylinder 20 of foamed plastic with a thin-walled cylindrical liner 22 which may be made of phenolic resin. The foamed plastic cylinder 20 may be cut from a block of foamed plastic, the block being cut to circular cross-section and bored to the final configuration. The foamed plastic cylinder 20 is then impregnated with the floor wax and finally the cylindrical liner 22 is inserted and bonded in place by a suitable cement.

In this initial embodiment of the invention, the cylinder 20 is cut from polyethylene foam having a density of two pounds per cubic foot. The plastic foam cylinder is impregnated with a floor wax of a well-known type which includes carnauba wax, paraffin, and beeswax in a solvent consisting of a mixture of turpentine and mineral spirits. A wax mixture having a melting point of 118° F. is suitable and may be heated to 126°–129° F. for the purpose of impregnating the foamed plastic. A suitable floor wax for this purpose is "Trewax" which is commonly available in commerce.

As shown in FIG. 1, the axle member 12 is a piece of thin-walled three-quarter inch tubing having a straight portion 24 at one end to serve as the axle proper, the remainder of the tubing being formed to a reverse curvature as shown. The second end 25 of the tubing is substantially perpendicular to the straight portion and is centralized relative to the straight portion. The first end of the tubing is provided with a radial flange 26 which may be of approximately one inch diameter to pass through the one and one-half inch liner 22 with a liberal clearance of approximately one-fourth inch. In the construction shown the radial flange 26 is the flange of a plug-like nylon body 27 that seats in the end of the tubing with a forced fit. Nylon for this purpose is advantageous because it wears well and because it incurs minimum resistance.

The wooden handle 14 is a straight piece of wood of the configuration of a round rod that is dimensioned to fit into the second end 25 of the axle member 12. When the wooden rod 14 is inserted into the second end of the axle member 12 it encounters the curve of the tubing and is thereby effectively frictionally engaged by a wedging action. In the construction shown, the second end 25 of the axle member 12 is fixedly embraced by a thick polyvinyl sleeve 28 which is dimensioned to wedge into the thin metal tubing of a conventional domestic vacuum cleaner. Thus in the event the handle 14 is broken or lost, the housewife may substitute the vacuum cleaner tube.

The manner in which the invention serves its purpose may be readily understood from the foregoing description. To place the device into service, the housewife inserts the end of the wooden handle 14 into the second end 25 of the axle member 12. The wax-impregnated roller then is removed from the cylindrical container 16 and is unwrapped for use. It is a simple matter to insert the straight portion 24 of the axle member 12 through the axial bore of the roller 10 and then to roll the roller along the floor in the manner illustrated in FIG. 2.

In FIG. 2 the nylon flange 26 overhangs the end of the cylindrical liner 22 to maintain the roller and the axle member in cooperation with each other. With the handle and the axle member 12 inclined slightly as indicated in FIG. 2, the straight portion 24 of the axle member is urged forwardly downwardly with appreciable pressure to cause the straight portion 24 of the axle member to squeeze an adjacent continuously changing radial portion 30 of the foamed plastic cylinder 20 against the floor 32.

As heretofore noted, the straight portion 24 of the axial member being substantially smaller in diameter than the inside diameter of the cylindrical liner 22, tends to climb up the forwardly sloping inner circumferential surface of the liner, the straight portion of the axle member shifting slightly forward from a central position in the liner. As a result, the downward squeezing action of the straight portion 24 or of the axle member has a forwardly inclined component which is highly effective for releasing wax from the foamed plastic cylinder as the foamed plastic approaches the region of contact with the floor 32. This action not only facilitates release of the wax but also promotes even distribution of the wax.

At the end of a waxing operation the handle 14 may be separated from the axle member 12, if desired. The axle member 12 is withdrawn from the roller 10 and the roller is stored in the cylindrical container 16 until needed. Eventually the floor wax is exhausted from the foamed plastic and then a new roller 10 is purchased in a new container 16.

My description in specific detail of the selected embodiment of the invention will suggest various changes, substitutions and other departures from my disclosure within the spirit and scope of the appended claims.

I claim:
1. In a device for applying wax to a floor, the combination of:
   (a) a disposable foamed hollow plastic cylinder with an internal cylindrical liner, said cylinder being impregnated with a floor wax;
   (b) an axle member of round cross section for insertion into said cylindrical liner to roll said foamed plastic cylinder along the floor,
   (c) said axle member having an outside diameter substantially less than the inside diameter of the cylindrical liner whereby the axle member may lie in the lower half of the liner in tangential contact with the inner circumference of the liner with room for the axle member to shift forward from a central position relative to the liner;
   (d) a radial flange on one end of said axle member to engage one end of said liner when the axle member is in tangential contact with the inner circumference of the liner,
   (e) said flange being smaller in diameter than the inside diameter of the liner to permit said one end of the axle member to pass freely through the liner; and
   (f) a handle connected rigidly to the other end of said axle member to exert downward and forward force on said cylindrical liner by said axle member to roll said foamed plastic cylinder along the floor to squeeze a continuously changing radial portion of the foamed plastic cylinder against the floor to release the wax progressively from the foamed plastic.

2. A combination as set forth in claim 1 in which:
   (g) said axle member is of a diameter on the order of one-half the inside diameter of the liner whereby, when the axle member is rolling the foamed plastic cylinder along the floor, substantially the whole of the axle member lies in the lower half of the liner and tends to climb the forward upwardly sloping inner circumferential surface of the liner with consequent application of a forwardly and downwardly squeezing force on said continuously changing radial portion of the foamed plastic cylinder.

3. A dismantled sales unit to be assembled by the purchaser for waxing a floor, comprising:
   (a) a disposable foamed hollow plastic cylinder with an internal cylindrical liner, said cylinder being impregnated with a floor wax;
   (b) a tubular axle member having a straight portion at a first end thereof for insertion into said cylindrical liner to roll said foamed plastic cylinder along the floor,
   (c) said axle member being curved with its second end substantially perpendicular to its first end centrally of said straight portion;
   (d) said axle member having an outside diameter substantially less than the inside diameter of the cylindrical liner whereby the axle member may lie in the lower half of the liner in tangential contact with the inner circumference of the liner with room for the axle member to shift forward from a central position relative to the liner;
   (e) a body on said first end of the tubular axle member providing a flange to engage one end of said liner when the axle member is in tangential contact with the inner circumference of the liner, and
   (f) a separate elongated handle releasably fixedly engageable with said second end of the axle member to exert downward and forward force on said cylindrical liner by said straight portion of the axle member to roll said foamed plastic cylinder along the floor to squeeze a continuously changing radial portion of the foamed plastic cylinder against the floor to release the wax progressively from the foamed plastic.

4. A combination as set forth in claim 3 in which:
 (g) said axle member is of a diameter on the order of one-half the inside diameter of the liner whereby when the axle member is rolling the foamed plastic cylinder along the floor substantially the whole of the axle member lies in the lower half of the liner and tends to climb the forward upwardly sloping inner circumferential surface of the liner with consequent application of a forwardly and downwardly squeezing force on said continuously changing radial portion of the foamed plastic cylinder.

5. A combination as set forth in claim 4 in which:
 (h) said body is a smooth surfaced plastic body.

6. A combination as set forth in claim 5 in which:
 (i) said body is made of nylon.

7. A dismantled sales unit to be assembled by the purchaser for waxing a floor, comprising:
 (a) a disposable foamed hollow plastic cylinder with an internal cylindrical liner, said cylinder being impregnated with a floor wax;
 (b) a tubular axle member having a straight portion at a first end thereof for insertion into said cylindrical liner to roll said foamed plastic cylinder along the floor,
 (c) said axle member being curved with its second end substantially perpendicular to its first end centrally of said straight portion;
 (d) said axle member having an outside diameter substantially less than the inside diameter of the cylindrical liner whereby the axle member may lie in the lower half of the liner in tangential contact with the inner circumference of the liner with room for the axle member to shift forward from a central position relative to the liner,
 (e) said tubular axle member having a radial flange on said first end to engage one end of the liner; and
 (f) a sleeve on said second end of the axle member adapted to telescope into a wand of a vacuum cleaner.

References Cited in the file of this patent

UNITED STATES PATENTS

| | | |
|---|---|---|
| 2,411,842 | Adams | Dec. 3, 1946 |
| 2,541,396 | Winkley et al. | Feb. 13, 1951 |
| 2,935,757 | Phillips | May 10, 1960 |
| 2,984,853 | Williams | May 23, 1961 |

FOREIGN PATENTS

| | | |
|---|---|---|
| 679,794 | Great Britain | Sept. 24, 1952 |